United States Patent Office 3,248,266
Patented Apr. 26, 1966

3,248,266
METHOD OF PREPARING AN ELECTRODE
STRUCTURE
Guy Rampel, East Brunswick, N.J., assignor to Gulton Industries, Inc., Metuchen, N.J., a corporation of New Jersey
No Drawing. Filed Jan. 4, 1962, Ser. No. 164,382
5 Claims. (Cl. 136—75)

This invention relates to electrode structures which, depending upon the properties of the active electrode substance carried thereby, have utility as either the positive or negative element in an electrochemical cell. In its more particular aspects, this invention relates to nickel and cadmium electrode structures having utility in electrochemical cells, and to a method of producing such structures.

Heretofore, various methods have been employed in the preparation of electrode elements such as, for example, nickel and cadmium electrodes. While reasonably satisfactory results have been obtained in accordance with conventional practices, such methods are inadequate in a number of respects including, for example, their inability to provide for the utilization of a high percentage of the available active material in the end product. Apart from such technical deficiencies, present methods of producing electrodes such as nickel and cadmium electrodes have important disadvantages from the standpoint of economic considerations in that they require substantial amounts of time, in addition to specialized equipment, to successfully carry them out.

In accordance with the present invention, a method of preparing electrodes, nickel and cadmium electrodes in particular, is provided which makes available, in the nickel electrode, for example, upwards of 95% of the active substance, and which, in the cadmium electrode, makes available upwards of 85% of the active substance. Moreover, the method of this invention reduces, in certain cases by as high as approximately 80%, the processing time necessary, as against various conventional procedures, for producing such electrodes without the need for specialized equipment and under less exacting conditions than utilized in conventional procedures.

I have discovered that the objectives of this invention can be achieved by a series of steps which include initially impregnating a porous unit mass or structure of sintered or interconnected particles with an organic solvent of low surface tension having dissolved therein a suitable compound which is capable of conversion within the mass to an active electrochemical state. In the particularly preferred aspects of this invention, a sintered nickel matrix is most advantageously employed as the supporting material for the electrodes. This porous matrix may be of the type utilized in the construction of conventional nickel-cadmium electrodes and may be prepared by sintering nickel powder obtained from nickel carbonyl. The porous structure may vary considerably in dimensions and other characteristics such as porosity and pore volume. The terms "mass" and "structure" are, therefore, used herein in a generic sense to cover the electrodes in whatever physical shape or form they may be prepared.

The surfaces of the particles of the porous structures having utility for the purposes of this invention may be advantageously coated with a relatively thin, intimately bonded layer of a compound capable of conversion within the structure to an active electrode substance by contacting, as by dipping, the structure into a solution of an organic solvent having a low surface tension containing the dissolved compound. Such a procedure readily lends itself to a continuous operation thereby effecting considerable saving in time in preparing the electrodes.

The term "low surface tension" as used in the description and the claims hereof refers to the surface tension of the organic solvent of which the impregnating solution is constituted as compared to water per se as the solvent. The organic solvents having utility for the purposes of this invention, therefore, are characterized by having a surface tension lower than that of water. Desirably, this property of the solvents used in preparing the impregnating solutions will be at least 20%, and especially desirably 40% to 60%, or more, lower than the surface tension of water.

Following impregnation, which, in the main, may be achieved in a matter of a few minutes, excess organic solvent solution is allowed to drain off and the porous structure desirably is then dried. Forced drying procedures may be advantageously employed at this point to further reduce processing time. The temperatures utilized to achieve the desired effect may vary over a wide range. Good results are obtained at a temperature in the range of 30° C. to 250° C., with optimum effects being realized at a temperature of from 50° C. to about 200° C.

Conversion of the compound deposited on the surfaces of the interconnected particles of the porous structure to an electrochemically active state is desirably accomplished by placing the structure in its substantially dry condition into a 25 to 35% solution of either sodium or potassium hydroxide and subjecting the structure to a cathodic electrolytic process. This process, which is generally referred to as cathodic polarization, is ordinarily carried on at an initial temperature of about 100° C. using currents of 15 amperes for the negative plates and 50 amperes for the positive plates. The length of time that the structure remains in the solution may vary considerably. I have found that the desired conversion of the compound in the structure may be achieved in an interval of the order of 10 minutes.

Upon removal from the alkali bath, the porous structure is desirably washed substantially free of alkali and dried. The cycle of contacting the structure with the surface tension lowering organic solvent solution of a convertible nickel or cadmium compound, drying, and alkali cathodization may be advantageously repeated one or more times until the porous structure has taken up a sufficient quantity of the desired active material.

In utilizing the method of this invention to produce nickel and cadmium electrodes, treatment of the structure in the alkali solution converts the nickel or cadmium compound, whichever the case may be, to its corresponding hydroxide, that is nickel hydroxide, $Ni(OH)_2$, or cadmium hydroxide, $Cd(OH)_2$. In determining the degree and adequacy of the deposition of the desired active material within the structure, the increase in weight thereof provides a most convenient standard for monitoring the operation. Generally, this determination will elicit a final weight increase in the structure of at least 15%, and, better still, from 20% to 100%, or more, over its original weight. An alternative, but less convenient, procedure for ascertaining the degree of potentially active component up-take by the structure is to determine the extent to which the porosity of the structure has diminished. Generally, this determination represents a decrease in porosity within the structure of at least 10%, and usually and better still from 25% to 75%, or more, of its initial porosity.

When employing my method to produce nickel electrodes, it is desirable to use nickel compounds which are soluble in the low surface tension organic solvents having utility for the purposes of this invention and which nickel compounds are susceptible to conversion to nickel hydroxide in an alkali solution supported by cathodic polarization. Examples of compounds enabling the fulfillment of this aspect of the invention are nickel acetate, nickel ammonium sulfate, nickel bromide, nickel chloride, nickel nitrate, nickel oxalate, nickel sulfamate, nickel sulfate, and the like.

A variety of organic solvents solubilizing agents can be employed in preparing the improved impregnating solutions utilized in the present invention. By way of example, and not limitation, such agents include lower alcohols, exemplified by methyl alcohol, ethyl alcohol, propyl alcohol, isopropyl alcohol, and butanol; ketones such as acetone and dioxane; ethers such as isopropyl ether; glycols and glycol ethers and esters exemplified by diethylene glycol, methyl Cellosolve, ethylene glycol diproprionate, and benzyl Cellosolve; and the like. Effective results also can be achieved with aqueous solutions of such solvents, in combination with a suitable surface active agent to which further reference will be made hereinafter.

The quantity of convertible compound dissolved in the low surface tension impregnating organic solvent solutions having utility in the present invention may vary over a wide range. By way of example, organic solvent solutions containing a quantity of the compound approximately equal to one-tenth of the molecular weight of the compound are satisfactory. Most generally the solutions comprise from about 0.5 to 1.0 gram of the compound per milliliter of solution. The objectives of the invention, however, may be effectively achieved with a solution comprising, by weight, based on the total weight of the solution, from about 60% to 85% of the compound and from 40% to 15% of solvent.

The distribution and deposition within the porous supporting structure of the compound dissolved in my impregnating solutions is advantageously facilitated and enhanced by desirably incorporating in the solutions a minor proportion, of the order of 1 to 2% by weight, of a nonionic, anionic, or cationic surface active agent or surfactant. Such substances serve to further lower the surface tension of the impregnating organic solvent solutions, permitting much improved contact of the convertible compounds with the particle surfaces of the porous mass. There are numerous agents having utility in my method for this purpose, examples of which are compounds selected from the group consisting of nonionic surfactants exemplified by the sorbitan higher fatty acid esters and the polyoxyethylene derivatives thereof, such as are sold under the trademarks "Span" and "Tween," specific examples of which are sorbitan monolaurate and polyoxyethylene sorbitan monostearate; alkyl phenol polyoxyethylene glycol ethers such as are sold under the trademark "Tergitol," exemplified by nonyl and hexadecyl phenol polyoxyethylene glycol ethers; anionic surfactants such as the alkyl aryl polyether sulfonates sold under the trademark "Triton," and exemplified by the sodium salts of alkyl phenol polyether sulfates; alkyl aryl sulfonates such as are sold under the trademarks "Udet" and "Ultrawet," exemplified by the higher alkylbenzenesulfonates and the lower alkylnaphthalenesulfonates; and cationic surfactants exemplified by the N-higher alkyl quaternary ammonium salts such as are sold under the trademarks "Arquad" and "Sapamine," specific examples of which are n-dodecyl trimethyl ammonium chloride and di-n-octadecyl dimethyl ammonium chloride; ethylene oxide condensation products of the primary fatty amines such as are sold under the trademark "Ethomeen," exemplified by polyoxyethylene higher alkyl tertiary amines; and the like surfactants.

The following are illustrative specific examples of the manner of carrying out the method of this invention:

EXAMPLE I

A plaque or matrix of sintered nickel was dipped into a solution comprising 27.3 grams of nickel nitrate and 10.6 grams of methyl alcohol and allowed to remain therein for 2 minutes. The matrix was removed from the solution and forced air dried at a temperature of 50° C. Following drying the matrix was placed in a 30% caustic soda bath at a temperature of 100° C. for 10 minutes. During this period it was subjected to cathodic polarization using a current of 50 amperes. It was then removed from the bath, washed and dried. This cycle was repeated 3 more times. The results were as follows:

Initial specifications of matrix (1) Weight _____ grams__ 7.9
(2) Porosity _____ percent__ 72
(3) Total pore volume _____ ml__ 2.4

Specifications of matrix after processing (1) Weight _____ 11.5 grams.
(2) Porosity _____ 30%.
(3) Ni(OH)$_2$ pickup ___ 1.5 grams/ml. of pore volume.

EXAMPLE II

A plaque of sintered nickel was dipped into a solution comprising 35.8 grams of cadmium nitrate and 10.4 grams of methyl alcohol and allowed to remain therein for 2 minutes. The plaque was removed from the solution and dried at a temperature of 50° C. Following drying the plaque was placed in a 25% caustic soda bath at a temperature of 100° C. for 10 minutes. During this interval it was subjected to a cathodic electrolytic process using a current of 15 amperes. It was then removed from the bath, washed and dried. This cycle was repeated twice. The results were as follows:

Initial specifications of plaque (1) Weight _____ grams__ 7.9
(2) Porosity _____ percent__ 72
(3) Total pore volume _____ ml__ 2.4

Specifications of plaque after processing (1) Weight _____ 13.5 grams.
(2) Porosity _____ 30%.
(3) Cd(OH)$_2$ pickup __ 2.35 grams/ml. of pore volume.

EXAMPLE III

A nickel plaque was dipped in a solution comprising 24 grams of nickel sulfate, 6.5 grams of ethyl alcohol, 4.5 grams of water and 0.3 gram of polyoxyethylene sorbitan monostearate. It was allowed to remain therein for 1 minute. The plaque was removed from the solution, permitted to drain, and then forced air dried at 45° C. Following drying, the plaque was placed in a 25% potassium hydroxide solution at a temperature of 100° C. for 10 minutes during which time it was subjected to cathodic polarization using a current of 50 amperes. The plaque was then removed, washed and dried. This cycle was repeated 3 more times. The results were as follows:

Initial specifications of the plaque (1) Weight _____ grams__ 7.5
(2) Porosity _____ percent__ 72
(3) Total pore volume _____ ml__ 2.5

Specifications of the plaque after processing (1) Weight _____ 12.5 grams.
(2) Porosity _____ 30%.
(3) Ni(OH)$_2$ pickup ___ 1.8 grams/ml. of pore volume.

The organic solvents and surface active agents employed in making the solutions utilized in this invention are substantially inert with respect to the supporting structure and do not have any deleterious effects thereon. The solutions as constituted readily and effectively penetrate the innermost areas of the porous supporting structures, depositing on the surfaces of the interconnected particles thereof a thin, substantially uniform coating of the solution. Upon drying, the dissolved convertible compound contained in the solution intimately adheres to the particle surfaces. In this state a substantial percentage of the compound is available for conversion to the desired corresponding hydroxide during cathodization in the caustic solution.

As indicated previously hereinabove, the coefficient of utilization in the production of nickel and cadmium electrodes in accordance with the practice of this invention approaches 95% and 85%, respectively, as compared to approximately 50% to 60% in conventional methods of producing such electrodes. This greater utilization of the convertible compounds enables an electrochemical cell employing the electrodes produced by my method to operate at higher discharge rates for a substantial portion of the discharge cycle. This effect is particularly desirable where close voltage control is required at relatively high current densities.

The electrodes of this invention, following conversion of the impregnated compound to the electrochemically active substance desirably may be processed to remove substantially all of the active substance from the external surfaces thereof. This serves to reduce the possibility of flaking or shedding when they are used in an electrochemical cell and thus adds to the life of the cell which might otherwise be internally short circuited by such activity.

Because excellent impregnation of the matrix with the convertible compound can be achieved by simply dipping the matrix in the solutions, the method of this invention is particularly adaptable to a continuous operation. The overall result as indicated earlier, is the realization, in certain cases, of as high as approximately an 80% reduction in processing time over conventional methods.

While the foregoing detailed description has been directed in the main to the applicability of the invention to the production of nickel and cadmium electrodes, this has been done for purposes of explanation only and no unnecessary limitation should be assigned to the invention, it being understood that the principles herein described are applicable to the production of other types of electrodes such as zinc, lead, platinum, and the like, wherein distribution and deposition of an active electrode substance on or within a porous supporting structure is required to achieve a desired electrochemical effect. Therefore, this invention is to be limited only by the scope of the appended claims and prior art.

I claim:
1. A method of preparing an electrode structure comprising contacting a porous metal structure with a solution consisting essentially of an organic solvent in which is dissolved a metallic compound capable of conversion within the structure to an electrochemically active electrode substance, said solvent having a lower surface tension than that of water per se, depositing said compound on the surfaces of the structure by removing volatile portions of the solution from the structure, and then converting said thus deposited compound to its electrochemically active electrode state.

2. A method of preparing an electrode structure comprising contacting a porous nickel matrix with a solution consisting essentially of an organic solvent in which is dissolved a compound capable of conversion within the matrix to an electrochemically active electrode substance, said solvent having a surface tension lower than that of water per se, depositing said compound on the surfaces of the matrix by removing volatile portions of the solution from the structure, and converting said thus deposited compound to its electrochemically active electrode state.

3. A method of preparing an electrode structure comprising contacting a porous nickel matrix with a solution consisting essentially of an organic solvent in which is dissolved a compound selected from the group consisting of nickel and cadmium salts, said solvent having a surface tension lower than that of water per se, depositing said compound on the surfaces of the matrix by removing volatile portions of the solution from the matrix, and then converting said thus deposited compound to its corresponding hydroxide.

4. A method of preparing an electrode structure comprising dipping a porous nickel matrix into a solution consisting essentially of an organic solvent in which is dissolved a surfactant and a compound selected from the group consisting of nickel and cadmium salts, said solvent having a surface tension lower than that of water per se, substantially drying the matrix to deposit a layer of said compound on the surfaces of the matrix, placing the matrix in an alkali bath and subjecting the matrix while in the bath to a cathodic electrolytic process to convert said compound on the surfaces thereof to an electrochemically active electrode substance, removing the alkali from the matrix, and repeating the cycle to increase the amount of electrochemically active substance deposited on the surface of the matrix.

5. A method of preparing an electrode structure comprising dipping a nickel plaque into a solution comprising essentially 60 to 85% of a compound selected from the group consisting of nickel nitrate and cadmium nitrate and 40 to 15% of methyl alcohol, substantially drying the plaque at a temperature of about 50° to 200° C., placing the plaque in a heated 25 to 35% caustic solution and subjecting the plaque while in the caustic solution to cathodic electrolytic process to convert said compound to its potentially electrochemically active hydroxide, removing substantially all caustic solution from the plaque, and repeating the cycle until a weight increase of at least 15% over its original weight is elicited by the plaque.

References Cited by the Examiner
UNITED STATES PATENTS

| | | | |
|---|---|---|---|
| 2,850,555 | 9/1958 | Pucher et al. | 136—20 |
| 2,880,257 | 3/1959 | Murphy et al. | 136—29 |
| 2,952,570 | 9/1960 | Heuninckx | 136—24 |
| 3,024,296 | 3/1962 | Adler | 136—24 |

WINSTON A. DOUGLAS, *Primary Examiner.*

JOHN H. MACK, MURRAY TILLMAN, *Examiners.*